(12) United States Patent
Sandhu

(10) Patent No.: US 6,879,585 B2
(45) Date of Patent: Apr. 12, 2005

(54) INTERNET BASED MOBILE TERMINAL PROVISIONING

(75) Inventor: Parampreet Sandhu, Surrey (CA)

(73) Assignee: Sierra Wireless, Inc., Richmond (CA)

( * ) Notice: Subject to any disclaimer, the term of this patent is extended or adjusted under 35 U.S.C. 154(b) by 710 days.

(21) Appl. No.: 09/805,320

(22) Filed: Mar. 12, 2001

(65) Prior Publication Data

US 2002/0126655 A1 Sep. 12, 2002

(51) Int. Cl.[7] .......................... H04L 12/66; H04L 12/28
(52) U.S. Cl. ....................... 370/355; 370/392; 370/401; 370/431
(58) Field of Search ................................. 370/466, 467, 370/431, 401, 389, 392, 355, 352; 379/114.03; 709/227; 455/450; 713/200, 201, 170

(56) References Cited

U.S. PATENT DOCUMENTS

| | | | | |
|---|---|---|---|---|
| 6,065,120 A | * | 5/2000 | Laursen et al. | 713/201 |
| 6,138,158 A | * | 10/2000 | Boyle et al. | 709/225 |
| 6,144,849 A | | 11/2000 | Nodoushani et al. | 455/419 |
| 6,148,405 A | * | 11/2000 | Liao et al. | 713/201 |
| 6,587,684 B1 | * | 7/2003 | Hsu et al. | 455/419 |
| 6,725,056 B1 | * | 4/2004 | Moles et al. | 455/524 |

FOREIGN PATENT DOCUMENTS

| | | |
|---|---|---|
| EP | 0 942 576 A2 | 9/1999 |
| EP | 0 973 350 A2 | 1/2000 |
| EP | 0 973 350 A3 | 4/2000 |
| EP | 1 043 906 A2 | 10/2000 |
| EP | 0 942 576 A3 | 1/2002 |
| EP | 1 043 906 A3 | 1/2002 |

OTHER PUBLICATIONS

TR45, TIA/EIA/IS–683–A: "Over–the–Air Service Provisioning of Mobile Stations in Spread Spectrum Systems", May 1998.

* cited by examiner

*Primary Examiner*—Duc Ho
(74) *Attorney, Agent, or Firm*—Thelen Reid & Priest LLP

(57) ABSTRACT

A system and method for a user to initiate a data only session with a mobile terminal over a wireless network configured with an IS-683 protocol. The user selects a system with the mobile terminal in order to place a call with the wireless network. Next, a call is originated with the mobile terminal to the wireless network. A traffic channel is assigned for the call originated with the mobile terminal. The call is routed to a web server of the wireless network that collects user information from the mobile terminal. Finally, the web server will initiate the mobile data programming session with the mobile terminal such that the user does not need outside assistance from a customer service representative to initiate the call.

42 Claims, 1 Drawing Sheet

INTERNET BASED MOBILE TERMINAL PROVISIONING

BACKGROUND OF THE INVENTION

1. Field of the Invention

The present invention relates generally to mobile communications and more particularly a system and method for enabling data services through a mobile terminal.

2. Status of the Prior Art

With the implementation of data services on wireless networks, there has become a need for manufacturers of mobile devices to include data capability in future mobile terminals. Accordingly, mobile terminals with varying capabilities and form factors are becoming increasingly more available such as Data-Only PCMCIA cards for insertion into host devices and PDA's with integrated data modems. Accordingly, initial activation and on-going configuration of these mobile devices will become a concern for mobile communication carriers.

The Over-The-Air Service Provisioning Standard (OTASP), IS-683, is used by carriers to provision voice mobile terminals. The IS-683 standard relies on a Voice Service Option to initiate user based OTASP sessions and cannot be used by non-voice mobiles. Specifically, the IS-683 standard requires a customer service representative (CSR) to speak with the mobile user in order to initiate the OTASP session. Such a requirement limits the field of use and cost savings which can be achieved by the carrier. For example, the current implementation of IS-683 is not able to support data only mobile terminals. As previously discussed, in order to initiate a session, the customer must first speak with a CSR in order to activate OTASP sessions. This is not convenient because with the advent and evolution of CDMA networks that support packet data capability has resulted in a plethora of mobile terminals of varying form factors and capabilities (i.e., PCMCIA modem cards, PDA's with integrated modems, etc . . . ). Accordingly, the increasing number of mobile terminals will pose a significant challenge to carriers in controlling activation costs and on-going mobile terminal configuration costs.

The proposed IOTA standard is able to implement mobile terminal communications without the need to speak with a CSR. However, carriers who have already implemented an IS-683 system will need to replace their existing infrastructure in order to implement data only mobile terminals.

The present invention addresses the above-mentioned deficiencies in data provisioning of the IS-683 system by providing a method and system whereby the OTASP session can be initiated by a data call. As such, the mobile user can initiate a data session on an existing IS-683 based infrastructure without the need to contact a CSR thereby preserving the investment in existing IS-683 systems and still accommodating mobile terminals of differing capabilities.

SUMMARY OF THE INVENTION

In accordance with the preferred embodiment of the present invention, there is provided a method for a user to initiate a data only session with a mobile terminal over a wireless network configured with an IS-683 protocol. The method comprises the steps of selecting an appropriate system with the mobile terminal in order to place a call to the wireless network and originating the call with the mobile terminal to the wireless network. Next, a traffic channel is assigned for the call originated with the mobile terminal and the call is routed to a web server of the system. The web server will then collect information of the user from the mobile terminal and initiate the data only session. In this respect, the web server performs the functions of a customer service representative such that a data only session can be automatically initiated without outside assistance to the user.

Typically, the user will enter an activation code into the mobile terminal prior to originating the call to the wireless network. The activation code is entered into the mobile terminal by the user dialing digits thereon. After the call has been activated, the call may be routed via a PSTN, packet data network, or microbrowser to the web server. The web server in turn will collect user information including the name, address, and billing information of the user in order to initiate the data only session. The web server may be a secure web server such that all communications from the mobile terminal will occur in a secure manner.

In accordance with the present invention, there is provided a system for a data only session with a mobile terminal over a wireless network configured with the IS-683 protocol. The system comprises a base station configured to communicate with the mobile terminal. Furthermore, the system includes a router operative to direct the call received by the base station. A web server of the system is configured to receive the call from the router. The web server has application specific software that initiates the data session using the IS-683 protocol. Specifically, the application specific software allows the data only session to be initiated without the use of a customer service representative.

The base station is configured to initiate the call from an activation code entered into the mobile terminal by the user. Additionally, the base station can assign a traffic channel to the call. In the preferred embodiment, the router may be a packet data network, a PSTN network, or a microbrowser. The application specific software of the web server is configured to collect information regarding the user in order to initiate the data session.

In accordance with the present invention, there is provided a computer readable medium containing a program which implements a procedure for initiating a data only session over a wireless network having a web server and configured with an IS-683 protocol. The program of the computer readable medium collects information of the user from the mobile terminal and initiates the data only session over the wireless network via the web server.

BRIEF DESCRIPTION OF THE DRAWING

These, as well as other features of the present invention, will become apparent upon reference to the drawing wherein.

DETAILED DESCRIPTION OF THE PREFERRED EMBODIMENT

Figure 1:
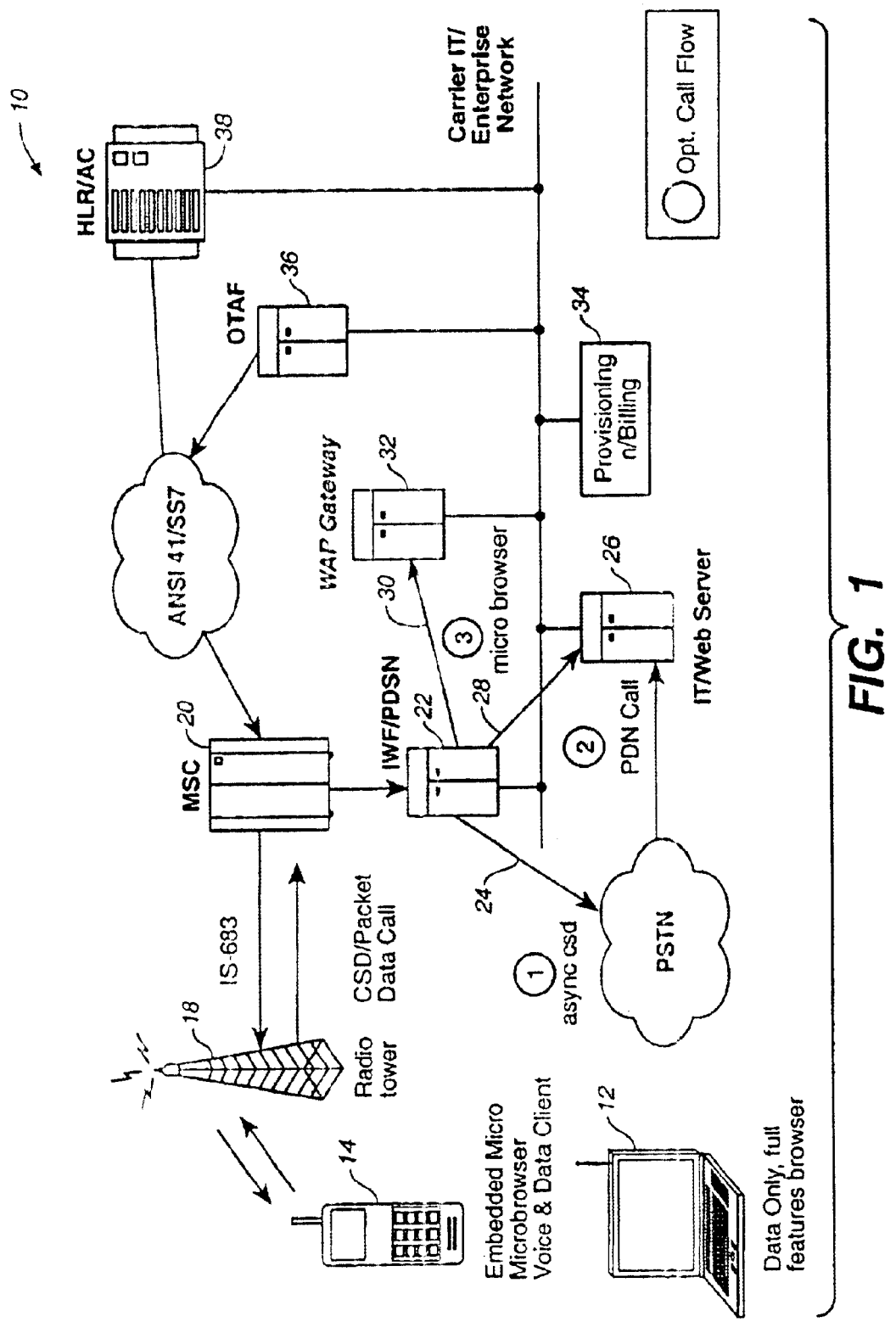
FIG. 1 is a network block diagram of an OTASP architecture utilizing the present invention.

Referring now to the drawing wherein the showings are for purposes of illustrating a preferred embodiment of the present invention only, and not for purposes of limiting the same, FIG. 1 illustrates an OTASP architecture 10 wherein a user of a mobile terminal does not need to contact a Customer Service Representative (CSR) to initiate a data only session. The user of a data only mobile terminal 12 or voice and data mobile terminal 14 is in communication with the OTASP architecture 10 via a radio tower (i.e., antenna) 18. The user directs the mobile terminal 12 to initiate an OTASP session. Upon initiation, the mobile terminal 12 will perform a system selection for the OTASP architecture 10 as defined in section 3.2.1 of the IS-683 standard. Once the selected system is acquired, the mobile terminal 12 will originate a call using a circuit switched data or packet data service option. Accordingly, the activation code for the session will be the digits dialed using the mobile terminal 12.

After receiving the activation code for the session, a base station (as per section 4.2 of IS-683) and a Mobile Switching Center (MSC) 20 will assign a traffic channel and perform the appropriate call handling procedures. Specifically, the base station may implement the procedures specified in IS-95-B (IS-95, IS-95-A, IS-95-B, CDMA 2000) and IS-707 for handling the call.

The MSC 20 will route the call to either an Interworking Function (IWF) or Packet Data Service Node (PDSN) 22, as shown in FIG. 1. The IWF or PDSN 22 can route the call to three possible locations depending upon the network configuration and the mobile application used to originate the call. The first option is to route the call via a Public Switched Telephone Network (PSTN) 24 to an IT/Web server 26. The second option is to route the call via a Packet Data Network (PDN) 28 to the IT/Web server 26. Finally, the third option is to route the call via a microbrowser 30 to the IT/Web server 26.

The IT/Web server 26 collects user specific provisioning information through the use of a dedicated application. Specifically, the application on the IT/Web server 26 will collect such provisioning information such as name, address, and credit card (billing) information for the user. Furthermore, the IT/Web server 26 will initiate the IS-683 requirements in order to initiate the mobile data programming session. The dedicated application run by the IT/Web server 26 may be implementation dependent according to the mobile carrier's requirements.

The mobile session (implemented circuit switched data) shall be maintained for the duration of the programming. The user should be informed via the mobile terminal 12 when the programming is successful. Additionally, the IT/Web server 26 may be a trusted server located inside the mobile carrier's firewall on a protected and secure segment. Accordingly, several security schemes can be deployed which are dependent upon the application. For example, if a web browser application is utilized, then SSL security can be initiated in order to protect the user's information.

As seen in FIG. 1, the OTASP architecture 10 of the present invention may further include a Wireless Application Protocol (WAP) gateway 32 and a provisioning and billing module 34. Furthermore, in order to place the call, the architecture 10 may include an Over-The-Air Service Provisioning Function (OTAF) 36 and Home Location Register/Authentication Center (HLR/AC) 38 utilizing the ANSI 41/SS7 protocol.

It will be recognized that by utilizing the IT/Web server 26 to collect user specific information, it is possible for the data session to be initiated without the use of a CSR. Specifically, the user will use his or her mobile terminal 12 to enter personal information which would normally be taken by the CSR. In this respect, the personal information will be transported to the IT/Web server 26 in order to initiate the IS-683 programming. The application running on the IT/Web server 26 will mimic the CSR such that the call can be initiated. Accordingly, existing IS-683 networks can be configured with an IT/Web server 26 in order to initiate data sessions without the need for a CSR.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A method for initiating an IS-683 session with a mobile terminal over a wireless network having a web server, the method comprising the steps of:
    a) selecting a system with the mobile terminal in order to place a call to the wireless network;
    b) originating a call with the mobile terminal to the wireless network;
    c) assigning a traffic channel for the call originated with the mobile terminal;
    d) routing the call to the web server of the wireless network to establish a data-only session between the web server and the mobile terminal;
    e) collecting information of the user from the mobile terminal with the web server via said data-only session; and
    f) initiating the IS-683 session over the wireless network via the web server.

2. The method of claim 1 wherein step (b) comprises the user entering an activation code into the mobile terminal and the call is originated using the activation code entered by the user.

3. The method of claim 2 wherein step (c) comprises assigning the traffic channel subsequent to the wireless network receiving the activation code.

4. The method of claim 3 wherein the activation code is entered by the user entering information into the mobile terminal.

5. The method of claim 4 wherein step (d) comprises routing the call via a Public Switched Telephone Network (PSTN) to the web server.

6. The method of claim 4 wherein step (d) comprises routing the call via a packet data network to the web server.

7. The method of claim 4 wherein step (d) comprises routing the call via a microbrowser to the web server.

8. The method of claim 4 wherein step (e) comprises collecting information regarding one of the name of the user, the address of the user, and billing information of the user.

9. The method of claim 4 wherein the web server is a secure web server connected to the wireless network and step (f) comprises initiating a secure data only session over the wireless network via the secure web server.

10. A system for establishing an IS-683 session with a mobile terminal over a wireless network configured with an IS-683 protocol, the system comprising:
    a base station to receive wireless communications with the mobile terminal;
    a router to direct the call received by the base station; and
    a web server configured to receive the call from the router, establish a data session with the mobile terminal, request provisioning information from the mobile terminal, receive said provisioning information from the mobile terminal, and initiate the data session using the IS-683 protocol without the need of assistance from a customer service representative.

11. The system of claim 10 wherein the base station is operative to initiate the call from an activation code entered into the mobile terminal by a user.

12. The system of claim 11 wherein the base station is operative to assign a traffic channel to the call after receiving the activation code.

13. The system of claim 12 wherein the mobile terminal has an input device and the activation code is entered into the mobile terminal via the input device by the user.

14. The system of claim 10 wherein the router directs the call over a packet data network.

15. The system of claim 10 wherein the router directs the call over a PSTN network.

16. The system of claim 10 wherein the router directs the call over a microbrowser.

17. The system of claim 10 wherein the application specific software is configured to collect information regarding the user in order to initiate the data session.

18. The system of claim 17 wherein the web server is a secure server such that a secure data only session is connected via the wireless network.

19. A system for transmission of data with a mobile terminal over a wireless network configured with an IS-683 protocol, the system comprising:
   receiving and transmitting means in communication with the mobile terminal;
   routing means configured to direct a call received by the receiving and transmitting means; and
   web access means configured to receive the call from the routing means and initiate the data only session over the wireless network without use of a customer service representative by requesting and receiving user provisioning information over a data session between the web server and the mobile terminal.

20. The system of claim 19 wherein the receiving and transmitting means is a base station.

21. The system of claim 19 wherein the routing means is a router operative to direct the call to the appropriate device.

22. The system of claim 19 wherein the web access means is a web server.

23. The system of claim 22 wherein the web server has application specific software configured to initiate the data session using the IS-683 protocol.

24. The system of claim 23 wherein the application specific software is configured to collect information regarding the user in order to initiate the data session.

25. A method for establishing an IS-683 session between a mobile terminal and a web server, the method comprising:
   receiving a call from the mobile terminal at a router;
   creating a data-only network session between the mobile terminal and the web server by forwarding said call from the router to the web server;
   receiving a request for provisioning information at said router from the web server via said data-only network session, said provisioning information regarding a user of the mobile terminal;
   forwarding said request for provisioning information from said router to the mobile terminal;
   receiving provisioning information at said router from the mobile terminal; and
   forwarding said provisioning information from the router to the web server to establish the IS-683 session.

26. The method of claim 25, wherein said data-only network session is a circuit switched data service session.

27. The method of claim 25, wherein said data-only network session is a packet data service session.

28. The method of claim 25, further comprising:
   receiving an activation code at the router from the mobile terminal; and
   forwarding the activation code from the router to the web server along with said call to create said data-only network session between the mobile terminal and the web server.

29. The method of claim 25, wherein said forwarding of said call includes forwarding said call via a Public Switched Telephone Network (PSTN) to the web server.

30. The method of claim 25, wherein said forwarding of said call includes forwarding said call via a packet data network to the web server.

31. The method of claim 25, wherein said forwarding of said call includes forwarding said call via a microbrowser to the web server.

32. The method of claim 25, wherein said provisioning information includes at least one of a name of the user, an address of the user, and billing information of the user.

33. An apparatus for establishing an IS-683 session between a mobile terminal and a web server, the apparatus comprising:
   means for receiving a call from the mobile terminal at a router;
   means for creating a data-only network session between the mobile terminal and the web server by forwarding said call from the router to the web server;
   means for receiving a request for provisioning information at said router from the web server via said data-only network session, said provisioning information regarding a user of the mobile terminal;
   means for forwarding said request for provisioning information from said router to the mobile terminal;
   means for receiving provisioning information at said router from the mobile terminal; and
   means for forwarding said provisioning information from the router to the web server to establish the IS-683 session.

34. The apparatus of claim 33, wherein said data-only network session is a circuit switched data service session.

35. The apparatus of claim 33, wherein said data-only network session is a packet data service session.

36. The apparatus of claim 33, further comprising:
   means for receiving an activation code at the router from the mobile terminal; and
   means for forwarding the activation code from the router to the web server along with said call to create said data-only network session between the mobile terminal and the web server.

37. The apparatus of claim 33, wherein said forwarding of said call includes forwarding said call via a Public Switched Telephone Network (PSTN) to the web server.

38. The apparatus of claim 33, wherein said forwarding of said call includes forwarding said call via a packet data network to the web server.

39. The apparatus of claim 33, wherein said forwarding of said call includes forwarding said call via a microbrowser to the web server.

40. The apparatus of claim 33, wherein said provisioning information includes at least one of a name of the user, an address of the user, and billing information of the user.

41. A program storage device readable by a machine, tangibly embodying a program of instructions executable by the machine to perform a method for establishing an IS-683 session between a mobile terminal and a web server, the method comprising:
   receiving a call from the mobile terminal at a router,
   creating a data-only network session between the mobile terminal and the web server by forwarding said call from the router to the web server;
   receiving a request for provisioning information at said router from the web server via said data-only network session, said provisioning information regarding a user of the mobile terminal;

forwarding said request for provisioning information from said router to the mobile terminal;

receiving provisioning information at said router from the mobile terminal; and forwarding said provisioning information from the router to the web server to establish the IS-683 session.

42. A method of a user to initiate a data only session with a mobile terminal over a wireless network configured with an IS-683 protocol and having a web server, the method comprising the steps of:

a) selecting a system with the mobile terminal in order to place a call to the wireless network;

b) originating a call with the mobile terminal to the wireless network;

c) assigning a traffic channel for the call originated with the mobile terminal;

d) routing the call to the web server of the wireless network;

e) collecting information of the user from the mobile terminal with the web server; and f) initiating the data only session over the wireless network via the web server;

wherein step (d) comprises routing the call via a Public Switched Telephone Network (PSTN) to the web server.

* * * * *

UNITED STATES PATENT AND TRADEMARK OFFICE
CERTIFICATE OF CORRECTION

PATENT NO. : 6,879,585 B2
APPLICATION NO. : 09/805320
DATED : April 12, 2005
INVENTOR(S) : Sandhu It is certified that error appears in the above-identified patent and that said Letters Patent is hereby corrected as shown below:

In section 56 of the cover page under OTHER PUBLICATIONS, insert --Taylor, Andrew, "Over-the-Air Service Provisioning", 1998 Annual Review of Communications, pages 953-959--.

Signed and Sealed this

Fourth Day of September, 2007

JON W. DUDAS
*Director of the United States Patent and Trademark Office*